US012596001B2

(12) United States Patent (10) Patent No.: US 12,596,001 B2
Mou et al. (45) Date of Patent: Apr. 7, 2026

(54) CALIBRATION DEVICE AND CALIBRATION METHOD FOR NON-CONTACT PHOTOGRAPHIC HOLE MEASUREMENT

(71) Applicant: CHENGDU AIRCRAFT INDUSTRIAL (GROUP) CO., LTD., Chengdu (CN)

(72) Inventors: Wenping Mou, Chengdu (CN); Yunfeng Jiang, Chengdu (CN); Mingcong Huang, Chengdu (CN); Zhenxi Jiang, Chengdu (CN); Weidong Li, Chengdu (CN); Gui Zhang, Chengdu (CN); Bo Li, Chengdu (CN); Xin Shen, Chengdu (CN)

(73) Assignee: CHENGDU AIRCRAFT INDUSTRIAL (GROUP) CO., LTD., Chengdu (CN)

( * ) Notice: Subject to any disclaimer, the term of this patent is extended or adjusted under 35 U.S.C. 154(b) by 0 days.

(21) Appl. No.: 18/774,545

(22) Filed: Jul. 16, 2024

(65) Prior Publication Data

US 2024/0369357 A1 Nov. 7, 2024

Related U.S. Application Data

(63) Continuation of application No. PCT/CN2022/125315, filed on Oct. 14, 2022.

(30) Foreign Application Priority Data

Jan. 18, 2022 (CN) .......................... 202210053088.8

(51) Int. Cl.
| *G01B 21/04* | (2006.01) |
| *G01B 11/00* | (2006.01) |
| *G01B 11/02* | (2006.01) |

(52) U.S. Cl.
CPC .......... *G01B 21/042* (2013.01); *G01B 11/002* (2013.01); *G01B 11/005* (2013.01); *G01B 11/02* (2013.01)

(58) Field of Classification Search
CPC .... G01B 11/002; G01B 21/042; G01B 11/005
(Continued)

(56) References Cited

U.S. PATENT DOCUMENTS

| 3,588,255 A | 6/1971 | John |
| 2006/0061155 A1 | 3/2006 | Steenson |

(Continued)

FOREIGN PATENT DOCUMENTS

| CN | 103292748 A | 9/2013 |
| CN | 103557802 A | * 2/2014 |

(Continued)

OTHER PUBLICATIONS

First Office Action issued in counterpart Chinese Patent Application No. 202210053088.8, dated Feb. 28, 2022.

(Continued)

*Primary Examiner* — Peter J Macchiarolo
*Assistant Examiner* — Monica S Young
(74) *Attorney, Agent, or Firm* — Westbridge IP LLC

(57) ABSTRACT

Disclosed are a calibration device for non-contact photographic hole measurement and a calibration method for non-contact photographic hole measurement. The device includes a base, an installation platform, a calibration assembly and an illumination compensator. The installation platform is provided at the base, and the calibration assembly is provided at the installation platform. In a calibration process, the base drives the installation platform to rotate around a Z axis, thereby driving the calibration assembly to rotate around the Z axis. At the same time, the installation platform drives the calibration assembly to rotate around an (Continued)

X axis. The illumination compensator is configured to fill light for a camera during a photography process.

14 Claims, 10 Drawing Sheets

(58) Field of Classification Search
USPC ........................................................... 73/802
See application file for complete search history.

(56) References Cited

U.S. PATENT DOCUMENTS

| | | | | |
|---|---|---|---|---|
| 2011/0040523 A1 * | 2/2011 | Matsushita | ............ | B23Q 17/22 |
| | | | | 702/152 |
| 2017/0082416 A1 * | 3/2017 | Besuchet | ............. | G01B 11/005 |
| 2019/0304131 A1 * | 10/2019 | Gesner | ................. | G01B 11/005 |

FOREIGN PATENT DOCUMENTS

| | | | | | |
|---|---|---|---|---|---|
| CN | 105136031 | A | | 12/2015 | |
| CN | 107957236 | A | * | 4/2018 | .......... G01B 11/005 |
| CN | 108827149 | A | | 11/2018 | |
| CN | 109186498 | A | | 1/2019 | |
| CN | 109341601 | A | | 2/2019 | |
| CN | 110076277 | A | | 8/2019 | |
| CN | 111060025 | A | | 4/2020 | |
| CN | 112461177 | A | | 3/2021 | |
| CN | 112712565 | A | | 4/2021 | |
| CN | 113369990 | A | | 9/2021 | |
| CN | 113701631 | A | * | 11/2021 | ............ G01B 11/00 |
| CN | 113739717 | A | | 12/2021 | |
| CN | 114061459 | A | | 2/2022 | |
| DE | 10203200 | C1 | | 8/2003 | |
| DE | 102019110389 | A1 | * | 10/2020 | ............ G02B 27/62 |
| JP | 2014153149 | A | * | 8/2014 | |
| KR | 101418462 | B1 | | 7/2014 | |
| WO | 03062747 | A1 | | 7/2003 | |

OTHER PUBLICATIONS

International Search Report and Written Opinion issued in corresponding PCT Application No. PCT/CN2022/125315, dated Dec. 29, 2022.

Notification to Grant Patent Right for Invention issued in counterpart Chinese Patent Application No. 202210053088.8, dated Mar. 16, 2022.

Xue et al., Establishment Method of Coordinate System Based on Laser Tracker for Automatic Drilling and Riveting System, Aeronautical Precision Manufacturing Technology, vol. 55, No. 1, pp. 10-14, dated Feb. 15, 2019.

Yin et al., Review of the System Model and Calibration for Fringe Projection Profilometry, Infrared and Laser Engineering, vol. 49, No. 3, pp. 127-144, dated Mar. 25, 2020.

Zhao et al., Research on Non-contact Measurement Method of Center Distance of Binaural Hole, Electrical and Automation, 2021, No. 3, pp. 163-166, dated Jun. 20, 2021.

\* cited by examiner

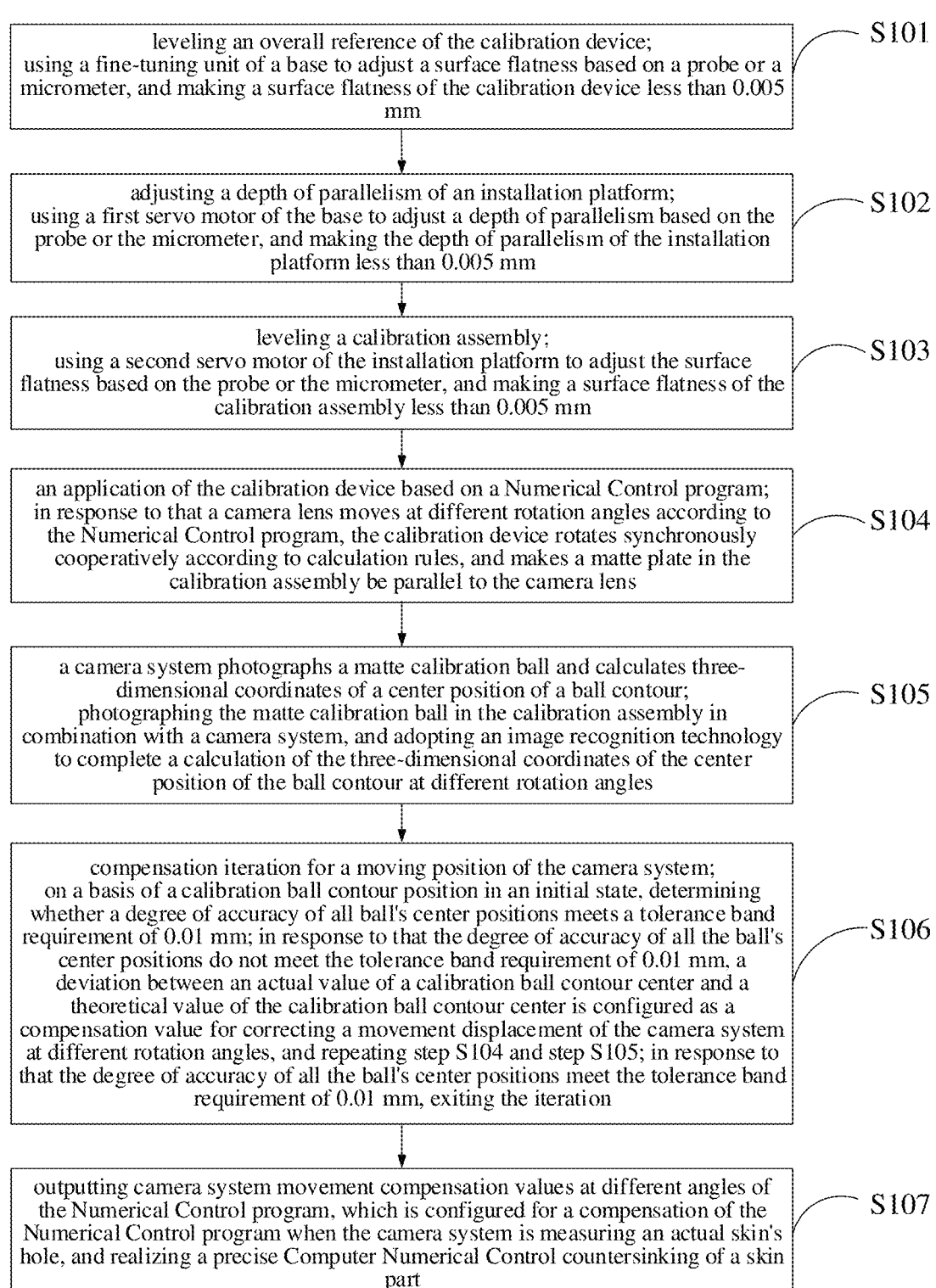

leveling an overall reference of the calibration device;
using a fine-tuning unit of a base to adjust a surface flatness based on a probe or a micrometer, and making a surface flatness of the calibration device less than 0.005 mm

S101 adjusting a depth of parallelism of an installation platform;
using a first servo motor of the base to adjust a depth of parallelism based on the probe or the micrometer, and making the depth of parallelism of the installation platform less than 0.005 mm

S102 leveling a calibration assembly;
using a second servo motor of the installation platform to adjust the surface flatness based on the probe or the micrometer, and making a surface flatness of the calibration assembly less than 0.005 mm

S103 an application of the calibration device based on a Numerical Control program;
in response to that a camera lens moves at different rotation angles according to the Numerical Control program, the calibration device rotates synchronously cooperatively according to calculation rules, and makes a matte plate in the calibration assembly be parallel to the camera lens

S104 a camera system photographs a matte calibration ball and calculates three-dimensional coordinates of a center position of a ball contour;
photographing the matte calibration ball in the calibration assembly in combination with a camera system, and adopting an image recognition technology to complete a calculation of the three-dimensional coordinates of the center position of the ball contour at different rotation angles

S105 compensation iteration for a moving position of the camera system;
on a basis of a calibration ball contour position in an initial state, determining whether a degree of accuracy of all ball's center positions meets a tolerance band requirement of 0.01 mm; in response to that the degree of accuracy of all the ball's center positions do not meet the tolerance band requirement of 0.01 mm, a deviation between an actual value of a calibration ball contour center and a theoretical value of the calibration ball contour center is configured as a compensation value for correcting a movement displacement of the camera system at different rotation angles, and repeating step S104 and step S105; in response to that the degree of accuracy of all the ball's center positions meet the tolerance band requirement of 0.01 mm, exiting the iteration

S106 outputting camera system movement compensation values at different angles of the Numerical Control program, which is configured for a compensation of the Numerical Control program when the camera system is measuring an actual skin's hole, and realizing a precise Computer Numerical Control countersinking of a skin part

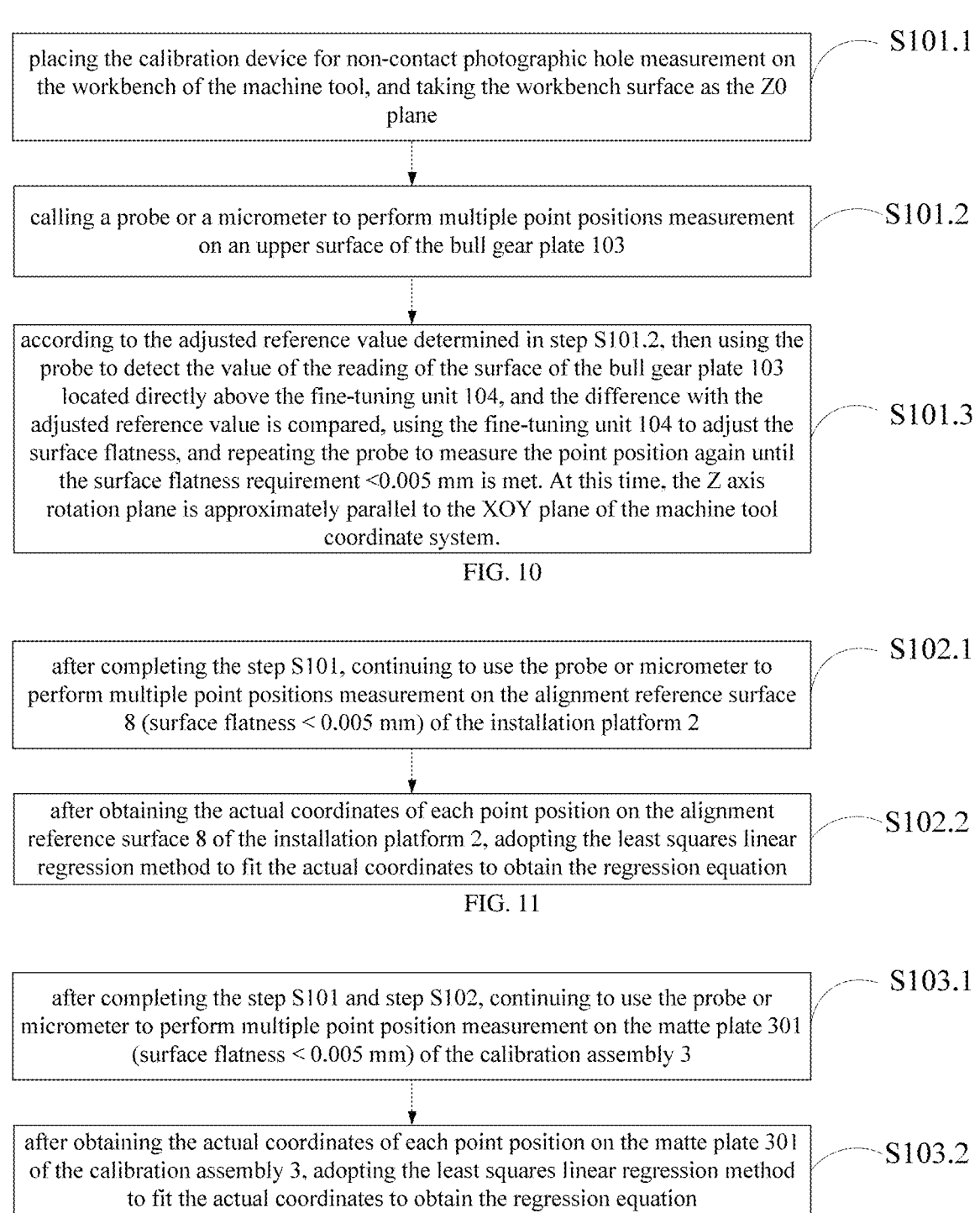

placing the calibration device for non-contact photographic hole measurement on the workbench of the machine tool, and taking the workbench surface as the Z0 plane — S101.1 calling a probe or a micrometer to perform multiple point positions measurement on an upper surface of the bull gear plate 103 — S101.2 according to the adjusted reference value determined in step S101.2, then using the probe to detect the value of the reading of the surface of the bull gear plate 103 located directly above the fine-tuning unit 104, and the difference with the adjusted reference value is compared, using the fine-tuning unit 104 to adjust the surface flatness, and repeating the probe to measure the point position again until the surface flatness requirement <0.005 mm is met. At this time, the Z axis rotation plane is approximately parallel to the XOY plane of the machine tool coordinate system. — S101.3

FIG. 10 after completing the step S101, continuing to use the probe or micrometer to perform multiple point positions measurement on the alignment reference surface 8 (surface flatness < 0.005 mm) of the installation platform 2 — S102.1 after obtaining the actual coordinates of each point position on the alignment reference surface 8 of the installation platform 2, adopting the least squares linear regression method to fit the actual coordinates to obtain the regression equation — S102.2

FIG. 11 after completing the step S101 and step S102, continuing to use the probe or micrometer to perform multiple point position measurement on the matte plate 301 (surface flatness < 0.005 mm) of the calibration assembly 3 — S103.1 after obtaining the actual coordinates of each point position on the matte plate 301 of the calibration assembly 3, adopting the least squares linear regression method to fit the actual coordinates to obtain the regression equation — S103.2

FIG. 12

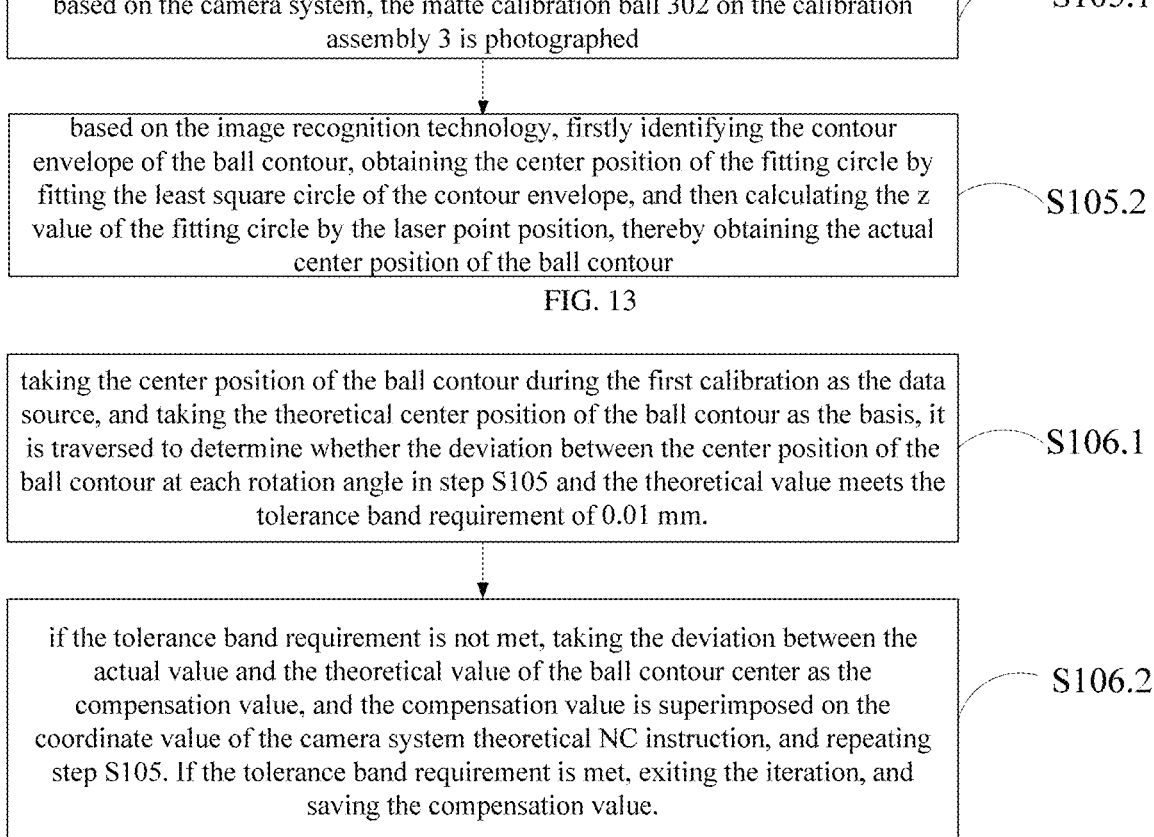

based on the camera system, the matte calibration ball 302 on the calibration assembly 3 is photographed  ⌒ S105.1 based on the image recognition technology, firstly identifying the contour envelope of the ball contour, obtaining the center position of the fitting circle by fitting the least square circle of the contour envelope, and then calculating the z value of the fitting circle by the laser point position, thereby obtaining the actual center position of the ball contour  ⌒ S105.2

FIG. 13 taking the center position of the ball contour during the first calibration as the data source, and taking the theoretical center position of the ball contour as the basis, it is traversed to determine whether the deviation between the center position of the ball contour at each rotation angle in step S105 and the theoretical value meets the tolerance band requirement of 0.01 mm.  ⌒ S106.1 if the tolerance band requirement is not met, taking the deviation between the actual value and the theoretical value of the ball contour center as the compensation value, and the compensation value is superimposed on the coordinate value of the camera system theoretical NC instruction, and repeating step S105. If the tolerance band requirement is met, exiting the iteration, and saving the compensation value.  ⌒ S106.2

FIG. 14

CALIBRATION DEVICE AND CALIBRATION METHOD FOR NON-CONTACT PHOTOGRAPHIC HOLE MEASUREMENT

CROSS-REFERENCE TO RELATED APPLICATIONS

This application is a continuation application of International Application No. PCT/CN2022/125315, filed on Oct. 14, 2022, which claims priority to Chinese Patent Application No. 202210053088.8, filed on Jan. 18, 2022. The disclosures of the above-mentioned applications are incorporated herein by reference in their entireties.

TECHNICAL FIELD

The present application relates to the field of machine vision, specifically to the technical field of image measurement and calibration, and in particular to a calibration device for non-contact photographic hole measurement and a calibration method for non-contact photographic hole measurement.

BACKGROUND

In aircraft assembly, the composite skin and the metal structural parts inside the aircraft are first assembled together by positioning holes. Affected by the assembly of the aircraft frame, the skin needs to be repaired on the frame to meet the installation requirements of the skin. Then the workers use portable drills to make a large number of connection holes on the skin, and then the Computerized Numerical Control (CNC for short) machine tool countersinks the positions of the connection holes. Finally, the workers use pneumatic tools to drive rivets into the countersunk holes, and at last, achieving a reliable connection between the skin and the metal structural parts.

During CNC countersinking, the position of each connection hole in the processing coordinate system must be accurately known, but there is a certain position deviation in the manual production process of the connection hole, so that the CNC machine tool cannot directly use the ideal CNC countersinking program. It is necessary to measure the position of the connection hole twice, and then recalculate the position and normal vector of the connection hole for CNC countersinking. Therefore, the key link of CNC countersinking lies in the secondary measurement of the hole position. The accuracy of the measurement directly determines the subsequent countersinking position accuracy. At present, there are two types of measuring instruments and measuring methods for hole positions on skin parts: contact measurement using a three-dimensional coordinate measuring machine; however, for large skin parts with hundreds of holes, the detection time of this measurement method is long, making it difficult to meet the requirements of high-efficiency production cycles; non-contact photographic hole measurement solution, this method has the advantages of image recognition, data processing, and rapid detection, and is therefore becoming the focus of research and the next development direction.

For the second measurement method, the non-contact photographic hole measurement solution, when determining the hole position and normal vector, the first thing to consider is the calibration of the photographic hole measurement. Only by the calibrated photographic hole measurement can the accurate calculation of the hole position be achieved. For Embodiment, in the prior art, Chinese Patent Application Publication NO. CN102126162A, published on Jul. 20, 2011, and the invention name is "A method for online measurement of CNC machine tool processing", its specific technical solution is: a method for online measurement of CNC machine tool processing, which can realize online measurement of large workpieces. The present invention combines a binocular stereo vision measurement system with a CNC machine tool, which is pulled by the CNC machine tool to complete the overall measurement of large workpieces. The method first calibrates the internal parameters and external parameters of the camera and combines the measurement system with the CNC machine tool; then performs translation calibration and rotation calibration, and calibrates the direction vectors of the X axis and Y axis of the CNC machine tool and the rotation matrix R and translation vector T after the measurement system is rotated; then the CNC machine tool pulls the measurement system to move and perform a single field of view scan until the entire surface of the workpiece is traversed; finally, the overall splicing is performed according to all the field of view point cloud data and the CNC machine tool spindle readings, that is, the overall measurement of the workpiece is completed. The present invention has the characteristics of flexible use, simplicity, high precision, etc., and can be configured for online measurement of large workpieces in industrial sites.

The above-mentioned prior art proposes a calibration method for a binocular stereo vision measurement system in a CNC machine tool. After establishing the spatial position relationship between the CNC machine tool coordinate system and the measurement coordinate system, it is configured for position relationship conversion of point cloud data. However, when using this method for photographic hole measurement, it can only ensure that the hole is within the camera's photographing area, but cannot determine the positioning accuracy of the hole. Moreover, for the photograph of the edge contour of the hole in the non-normal line direction, the hole contour will present an elliptical contour distortion, which will lead to errors in hole position calculation, and cannot meet the needs of accurate hole measurement.

SUMMARY

In order to overcome the problems and shortcomings in the above-mentioned prior art, the present application proposes a calibration device for non-contact photographic hole measurement and a calibration method for non-contact photographic hole measurement, which simulates the edge contour of the hole by converting the photographic hole measurement into a photographic calibration ball measurement, thereby achieving accurate calibration of the non-contact photographic hole measurement, and having a good overall application effect.

In order to achieve the above invention purpose, the technical solution of the present application is as follows.

A calibration device for non-contact photographic hole measurement, including a base, an installation platform, a calibration assembly and an illumination compensator. The base includes a base body, a first servo motor and a bull gear plate. The first servo motor is provided at one side of the base body, the bull gear plate is provided at an upper surface of the base body, and the first servo motor is meshed with the bull gear plate and is configured to drive the bull gear plate to rotate around a Z axis. The installation platform includes an U-shaped base, a second servo motor, a bevel gear pair and a worm wheel and worm. The U-shaped base is provided at an upper surface of the bull gear plate. The second servo motor, the bevel gear pair and the worm wheel and worm are all provided at the U-shaped base. The second servo motor is connected to the bevel gear pair, and the bevel gear pair is connected to the worm wheel and worm. The calibration assembly includes a matte plate and a matte calibration ball. The matte plate is provided at the U-shaped base and is connected to the worm wheel and worm. The matte calibration ball is provided at the matte plate, and the calibration assembly is configured to rotate around an X axis driven by the worm wheel and worm. The illumination compensator is composed of a high-brightness Light Emitting Diode (LED) lamp array and is provided at the matte plate to illuminate the matte calibration ball for a camera installed on a spindle end attached to the calibration device during a calibration process.

Furthermore, the base further includes a fine-tuning unit provided at a lower surface of the base body and configured to adjust a surface flatness of the base; the fine-tuning unit includes an integrally formed anti-slip nut and a screw stem, and the anti-slip nut is fixedly sleeved on the screw stem; a threaded blind hole is provided at the base body, and one end of the screw stem provided with a thread is provided in the threaded blind hole and is threadedly connected to the base body.

Furthermore, the matte calibration ball is provided on the matte plate.

Furthermore, the illumination compensator is provided at the matte plate and is provided below the matte calibration ball.

Furthermore, the illumination compensator includes an LED lamp array.

Furthermore, the bull gear plate is provided with an installing groove, and the U-shaped base is provided in the installing groove.

Furthermore, the bull gear plate is provided with a first tapered hole, the U-shaped base is provided with a second tapered hole coaxial with the first tapered hole, and a taper pin is provided in the first tapered hole and the second tapered hole.

Furthermore, an alignment reference surface is provided at the U-shaped base.

Furthermore, auxiliary installation blocks are respectively provided at inner walls of both sides of the U-shaped base, and both ends of the matte plate are respectively fixedly connected to the auxiliary installation blocks; one of the auxiliary installation blocks is rotatably connected to the inner wall of one side of the U-shaped base by a pin shaft, and a rotation shaft is rotatably provided at the inner wall of the other side of the U-shaped base; one end of the rotation shaft is connected to the worm wheel and worm, and the other end of the rotation shaft is connected to the other auxiliary installation block.

Furthermore, the matte plate is made of a translucent acrylic plate.

Furthermore, the matte calibration ball is made of a matte ceramic ball with a diameter of 10 mm and a ball's roundness of less than 0.001 mm.

A calibration method for non-contact photographic hole measurement, and the calibration method is implemented by adopting a calibration device for non-contact photographic hole measurement; the calibration method includes:

step S101, leveling an overall reference of the calibration device;

using a fine-tuning unit of a base to adjust a surface flatness based on a probe or a micrometer, and making a surface flatness of the calibration device less than 0.005 mm;

step S102, adjusting a depth of parallelism of an installation platform;

using a first servo motor of the base to adjust a depth of parallelism based on the probe or the micrometer, and making the depth of parallelism of the installation platform less than 0.005 mm;

step S103, leveling a calibration assembly;

using a second servo motor of the installation platform to adjust the surface flatness based on the probe or the micrometer, and making a surface flatness of the calibration assembly less than 0.005 mm;

step S104, applying the calibration device based on a Numerical Control program;

in response to that a camera lens moves at different rotation angles according to the Numerical Control program, the calibration device rotates synchronously cooperatively according to calculation rules, and makes a matte plate in the calibration assembly be parallel to the camera lens;

step S105, photographing a matte calibration ball and calculating three-dimensional coordinates of a center position of a ball contour by a camera system;

photographing the matte calibration ball in the calibration assembly in combination with a camera system, and adopting an image recognition technology to complete a calculation of the three-dimensional coordinates of the center position of the ball contour at different rotation angles;

step S106, performing a compensation iteration for a moving position of the camera system;

on a basis of a calibration ball contour position in an initial state, determining whether a degree of accuracy of all ball's center positions in step S105 meets a tolerance band requirement of 0.01 mm; in response to that the degree of accuracy of all the ball's center positions in step S105 do not meet the tolerance band requirement of 0.01 mm, a deviation between an actual value of a calibration ball contour center and a theoretical value of the calibration ball contour center is configured as a compensation value for correcting a movement displacement of the camera system at different rotation angles, and repeating step S104 and step S105; in response to that the degree of accuracy of all the ball's center positions in step S105 meet the tolerance band requirement of 0.01 mm, exiting the iteration;

step S107, outputting camera system movement compensation values of step S106 at different angles of the Numerical Control program, which is configured for a compensation of the Numerical Control program when the camera system is measuring a metal skin maintenance hole, and realizing a precise Computer Numerical Control countersinking of a metal skin.

Furthermore, the step S101 includes:

using the probe or the micrometer to perform multiple point positions measurement on an upper surface of the bull gear plate, and selecting one of a maximum value of measured data, a minimum value of the measured data and an average value of the measured data as an adjusted reference value; taking a difference between the measured data and the reference value as an adjustment basis, and adjusting the surface flatness of the calibration device as a whole by the fine-tuning unit.

Furthermore, the step S102 includes:

using the probe or the micrometer to perform multiple point positions detection on an alignment reference surface of the installation platform according to a rule that the Z axis coordinate remains unchanged, selecting (x, y) coordinates in detection data for linear fitting, and obtaining a slope of a fitting line $k_1$ and an inclination angle of the fitting line $\theta_1 = \arctan(k_1)$; adjusting the alignment reference surface of the installation platform to be parallel to a XOZ plane of a machine tool coordinate system in combination with the first servo motor, and setting a current rotation angle of the first servo motor to zero after completing adjustment.

Furthermore, the step S103 includes:

using the probe or the micrometer to perform multiple point positions measurement on the matte plate according to a rule that the X axis coordinate remains unchanged, selecting (y, z) coordinates in detection data for linear fitting, and obtaining a slope of a fitting line $k_2$ and an inclination angle of the fitting line $\theta_2 = \arctan(k_2)$, combining the second servo motor, the bevel gear pair and the worm wheel and worm to complete an overall rotation of the calibration assembly, and finally adjusting a plane of the matte plate to be parallel to a XOY plane of a machine tool coordinate system, and setting a current rotation angle of the second servo motor to zero after completing adjustment.

Furthermore, in the step S104, the calculation rules of the calibration device include:

in response to that rotation angles of a machine tool's rotation axis are angle A and angle C, directly applying the angle A and the angle C to a rotation of the calibration device around a Z axis and a rotation of the calibration device around an X axis;

in response to that the rotation angles of the machine tool's rotation axis are the angle A and angle B, first inversely solving the angle A and the angle B into vectors I, J, K, then recalculating the I, J, K as the angle C and the angle A, $A = \arccos(K)$, and $C = \arctan(-I/J)$; after obtaining a new angle A and a new angle C, applying the new angle A and the new angle C to the rotation of the calibration device around the Z axis and the rotation of the calibration device around the X axis; and in response to that the rotation angles of the machine tool's rotation axis are the angle B and the angle C, directly determining that the angle B=the angle A, which is applied to the rotation of the calibration device around the Z axis and the rotation of the calibration device around the X axis.

Beneficial effects of the present application are as follows.

Firstly, the calibration device proposed in the present application innovatively converts the traditional photographic hole measurement calibration into a photographic calibration ball measurement for calibration. Since the edge contour of the calibration ball under any camera angle is still circular, it commendably solves the problem and defect that when the traditional photographic hole measurement calibrating, the hole at different angles may be in a situation that being distorted into an ellipse, and thereby leading to increased error in hole coordinate calculation.

Secondly, the calibration method proposed in the present application can effectively solve the problem that the contour of the calibration ball is not in the center of the photo when the camera system photographs to measure the calibration ball due to the error of the machine tool's rotation axis. It not only improves the positioning accuracy of the camera system at different rotation angles of the machine tool, but also ensures the positioning accuracy of the camera system when photographing to measure the hole position in the skin, thereby realizing precise CNC countersinking of the skin.

BRIEF DESCRIPTION OF THE DRAWINGS

FIG. 9 is a schematic flowchart of a calibration method for non-contact photographic hole measurement according to an embodiment of the present application.

FIG. 10 is a schematic flowchart of a calibration method for non-contact photographic hole measurement according to an embodiment of the present application.

FIG. 11 is a schematic flowchart of a calibration method for non-contact photographic hole measurement according to an embodiment of the present application.

FIG. 12 is a schematic flowchart of a calibration method for non-contact photographic hole measurement according to an embodiment of the present application.

FIG. 13 is a schematic flowchart of a calibration method for non-contact photographic hole measurement according to an embodiment of the present application.

FIG. 14 is a schematic flowchart of a calibration method for non-contact photographic hole measurement according to an embodiment of the present application.

DETAILED DESCRIPTION OF THE EMBODIMENTS

Figure 1:
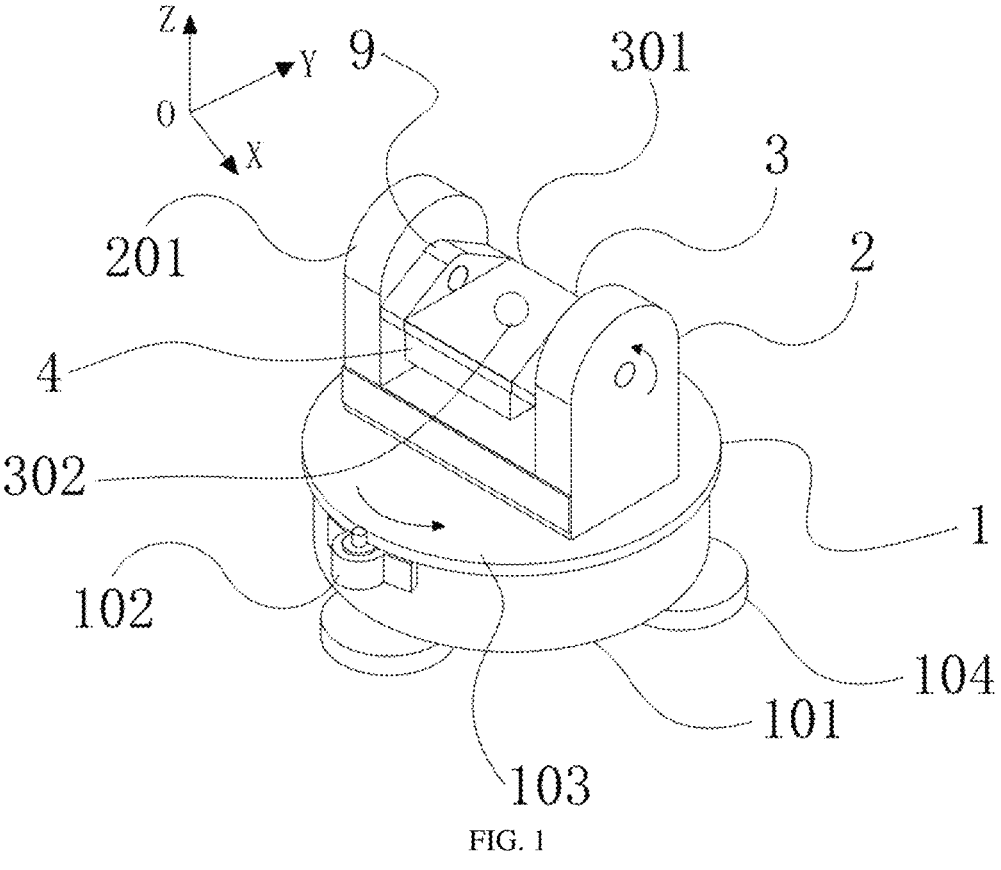
FIG. 1 is a three-dimensional structural schematic view of a calibration device according to the present application.

In order to enable those skilled in the art to better understand the technical solutions in the present application, the following will further illustrate the technical solutions for achieving the invention purpose of the present application by several specific embodiments. It should be noted that the technical solutions claimed for protection in the present application include but are not limited to the following embodiments. Based on the embodiments in the present application, all other embodiments obtained by those skilled in the art without creative work should fall within the scope of the present application.

At present, there are two types of measuring instruments and measuring methods for hole positions on skin parts: (1) contact measurement using a three-dimensional coordinate measuring machine; (2) non-contact photographic hole measurement method.

For the first measurement method, when the measurement method comes to large skin parts with hundreds of holes, the detection time of this measurement method is long, making it difficult to meet the requirements of high-efficiency production cycles. The second measurement method has the advantages of image recognition, data processing, and rapid detection, and is therefore becoming the focus of research and the next development direction.

However, when applying the existing non-contact photographic hole measurement method, the measured subject and object of the actual measurement is still the hole, which causes that for the photograph of the edge contour of the hole in the non-normal line direction, the hole contour will present an elliptical contour distortion, which will lead to errors in hole position calculation, and cannot meet the needs of accurate hole measurement.

Based on this, the present application provides a device for non-contact photographic hole measurement and a method for non-contact photographic hole measurement, which simulates the edge contour of the hole by innovatively converting the photographic hole measurement into a photographic calibration ball measurement, thereby achieving accurate calibration of the non-contact photographic hole measurement, and having a good overall application effect.

In order to facilitate the understanding of the present application, a device for non-contact photographic hole measurement disclosed in the present application is first introduced in detail.

The embodiment discloses a device for non-contact photographic hole measurement. Referring to FIG. 1 to FIG. 6 attached to the specification, the device includes a base 1, an installation platform 2, a calibration assembly 3 and an illumination compensator 4. The base 1 includes a base body 101, a first servo motor 102 and a bull gear plate 103. The base body 101 is a cylindrical structure as a whole. The first servo motor 102 is provided at one side of the cylinder. The bull gear plate 103 is rotatably provided at an upper surface of the cylinder. The bull gear plate 103 is provided with teeth along the circumferential direction. The output shaft of the first servo motor 102 is provided with a gear. The first servo motor 102 is meshed with the teeth on the bull gear plate 103 by the gear on the output shaft. Under the action of the first servo motor 102, the bull gear plate 103 rotates around the Z axis of the Cartesian coordinate system. The installation platform 2 includes a U-shaped base 201, a second servo motor 202, a bevel gear pair 203, and a worm wheel and worm 204. The U-shaped base 201 is fixedly provided at the upper surface of the bull gear plate 103, and rotates around the Z axis of the Cartesian coordinate system under the action of the bull gear plate 103. The second servo motor 202, the bevel gear pair 203, and the worm wheel and worm 204 are all provided in the U-shaped base 201. The output shaft of the second servo motor 202 is connected to the bevel gear pair 203, and the bevel gear pair 203 is connected to the worm wheel and worm 204. The calibration assembly 3 includes a matte plate 301 and a matte calibration ball 302, the matte plate 301 is provided at the U-shaped base 201 and connected to the output end of the worm wheel and worm 204, the matte plate 301 is located between the inner walls on both sides of the U-shaped base 201. The matte calibration ball 302 is provided at the matte plate 301, the calibration assembly 3 rotates around the X axis of Cartesian coordinate system driven by the worm wheel and worm 204. The calibration assembly 3 has two motion trajectories, one motion trajectory is the rotation around Z axis of Cartesian coordinate system, and the other motion trajectory is the rotation around X axis of Cartesian coordinate system. The illumination compensator 4 is configured to fill light for a camera's photography process when the camera photographs during a calibration process, thus making the contour of the calibration ball clearer, and finally making the photos taken clearer.

In this embodiment, the motion trajectory of the calibration device has two directions, one is the rotation around Z axis of Cartesian coordinate system, and the other is the rotation around X axis of Cartesian coordinate system.

When calibrating, the first servo motor 102 drives the bull gear plate 103 to rotate around the Z axis, and the second servo motor 202 drives the calibration assembly 3 to rotate around the X axis by the bevel gear pair 203 and the worm wheel and worm 204. During the calibration process, the calibration assembly 3 as a whole has both rotation around the Z axis and rotation around the X axis. The camera takes a picture of the matte calibration ball 302 to obtain several images of the circular contour projection of the calibration ball, and the above images are analyzed and calculated, so as to finally realize the calibration of the connection hole.

The present application innovatively converts the traditional photographic hole measurement calibration into a photographic calibration ball measurement for calibration. Since the edge contour of the calibration ball under any camera angle is still circular, it commendably solves that when the traditional photographic hole measurement calibrating, the hole at different angles may be in a situation that being distorted into an ellipse, thereby improving the calibration accuracy.

The present application provides a device for non-contact photographic hole measurement. Referring to FIG. 1 to FIG. 6 attached to the specification, based on the above embodiment, this embodiment further defines the calibration device, the details as follows.

The base 1 further includes a fine-tuning unit 104 provided at a lower surface of the base body 101. Three fine-tuning units 104 are provided, which are evenly distributed on the lower surface of the base body 101, and are configured to adjust a surface flatness of the base 1. The fine-tuning unit 104 is an integrated nut and screw stem structure, and includes an integrally formed anti-slip nut 1041 and a screw stem 1042. The anti-slip nut 1041 is fixedly sleeved on the screw stem 1042. The front section of the screw stem 1042 and the rear section of the screw stem 1042 have a diameter of 10 mm, one end of the end is conical, and the other end is an M8*10 thread. The surface of the anti-slip nut 1041 is provided with staggered scratches for anti-slipping. The diameter of nut 1041 is greater than 30 mm. A nut with a relatively large diameter is convenient for operators to use a relatively small torque for screwing. A threaded blind hole is provided at the base body 101, and one end of the screw stem 1042 provided with a thread is provided in the threaded blind hole. The screw stem 1042 is threadedly connected to the base body 101. The conical end of the screw stem 1042 contacts the workbench. Rotating the anti-slip nut 1041, the anti-slip nut 1041 drives the screw stem 1042 to rotate, thereby changing the installation depth of the screw stem 1042 in the threaded blind hole, and finally achieving the surface flatness adjustment of the base 1 as a whole.

A ball's center position of the matte calibration ball 302 is provided at an intersection position of a rotation center of the base 1 and a rotation center of the installation platform 2. When the circle's center position of the matte calibration ball 302 is located at the intersection of the two rotation centers, it is always located within the visual range of the camera system 6. Since no calibration required, the difficulty of calculating the subsequent rotation angles of the base 1 and the installation platform 2 can be reduced.

The illumination compensator 4 is provided at the matte plate 301 and is provided directly below the matte calibration ball 302. That is, the matte calibration ball 302 is provided at the upper surface of the matte plate 301, and the illumination compensator 4 is provided at the lower surface of the matte plate 301. The illumination compensator 4 is configured to compensate for the lack of natural light source and eliminate external interference during the camera photography process, so that the image is clearer, thus highlighting the clear circular contour projection of the matte calibration ball 302. When the illumination compensator 4 is located directly below the matte calibration ball 302, and the matte calibration ball 302 is approximately located in the middle position of the illumination compensator 4, the light source compensation is more sufficient and uniform, the camera photograph effect is better, and it is conducive to the subsequent calibration analysis.

The illumination compensator 4 is composed of a high-brightness Light Emitting Diode (LED) lamp array.

The bull gear plate 103 is provided with an installing groove 5, and the U-shaped base 201 is provided in the installing groove 5. The installation groove 5 is configured to install and fix the entire installation platform 2 to prevent the installation platform 2 from shaking left and right.

The bull gear plate 103 is provided with a first tapered hole 6, the U-shaped base 201 is provided with a second tapered hole 7 coaxial with the first tapered hole 6, and one taper pin is provided through the two tapered holes. In order to further fix the installation platform 2, while ensuring the positioning accuracy of repeated installation of the device, and also facilitating installation and disassembly, the embodiment firmly fixes the installation platform 2 on the base 1 by the matching positioning method of the tapered pin and the tapered hole, and the coaxiality of the U-shaped base 201 and the rotation center of the bull gear plate 103 is ensured at the same time.

An alignment reference surface 8 is provided at the U-shaped base 201.

Auxiliary installation blocks 9 are respectively provided at inner walls of both sides of the U-shaped base 201, and both ends of the matte plate 301 are respectively fixedly connected to the auxiliary installation blocks 9. One of the auxiliary installation blocks 9 is installed in a bearing hole on the inner wall of one side of the U-shaped base 201 by a pin shaft and a ball bearing, and is rotatably connected to the U-shaped base 201. The other auxiliary installation block 9 is rotatably connected to the inner wall of the other side of the U-shaped base 201 by a rotation shaft. The rotation shaft is rotatably provided in the bearing hole on the inner wall of the other side of the U-shaped base 201. One end of the rotation shaft is fixedly connected to the auxiliary installation block 9, and the other end of the rotation shaft is fixedly connected to the worm wheel and worm. The rotation shaft, driven by the worm wheel and worm, drives the auxiliary positioning block to rotate around the X axis, and finally drives the calibration assembly 3 connected thereto rotate around the X axis.

The matte plate 301 is made of a translucent acrylic plate.

The matte calibration ball 302 is made of a matte ceramic material, and has a diameter of 10 mm, and a ball's roundness is less than 0.001 mm.

One end of the worm wheel and worm 204 is processed into a bevel gear, which together with the bevel gear on the output shaft of the servo motor 202 constitutes the bevel gear pair 203. At the same time, the worm wheel and worm 204 has a self-locking function, which can ensure that the installation platform 2 will not be affected by gravity and cause unnecessary rotation when there is a certain angle.

Based on the same inventive concept, the present application provides a calibration method for non-contact photographic hole measurement, which is implemented by adopting the calibration device for non-contact photographic hole measurement in the above embodiment. As shown in FIG. 9 to FIG. 14, the method specifically includes the following steps.

Step S101, leveling an overall reference of the calibration device.

Since the base 1 of the calibration device for non-contact photographic hole measurement is the first rotation axis, its surface flatness is crucial to the degree of accuracy of the entire device. Therefore, first of all, the calibration device needs to be leveled an overall reference. The step-by-step implementation plan is as follows.

S101.1, placing the calibration device for non-contact photographic hole measurement on the workbench of the machine tool, and taking the workbench surface as the Z0 plane.

Figure 2:
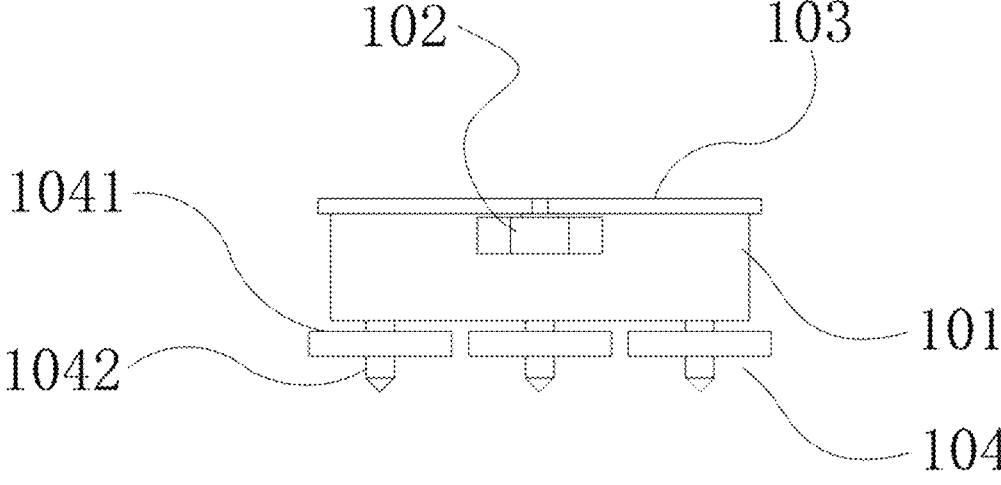
FIG. 2 is a three-dimensional structural schematic view of a base according to the present application.
Figure 3:
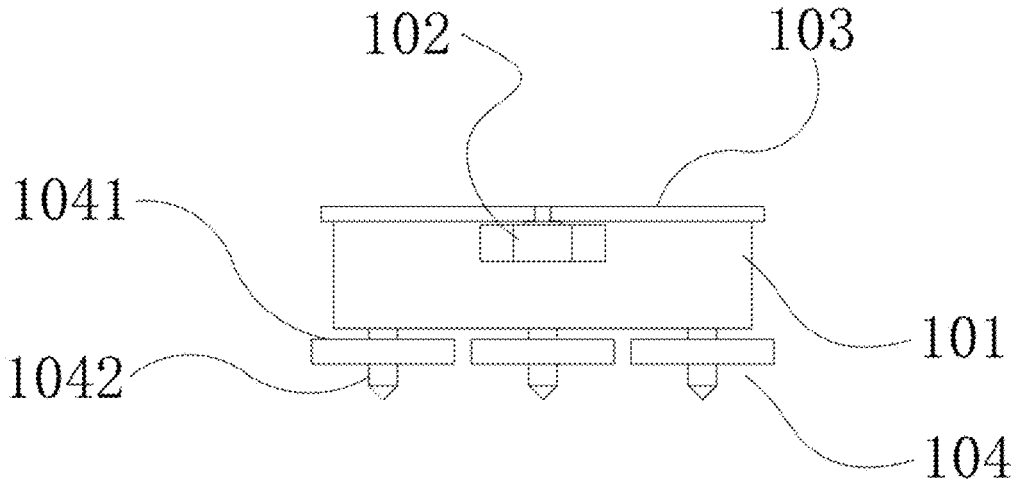
FIG. 3 is a side structural view of a base according to the present application.

S101.2, calling a probe or a micrometer to perform multiple point positions measurement on an upper surface of the bull gear plate 103, as shown in FIG. 2 of the specification. Taking the probe reading as an example, assuming that the readings of the point position to be measured $1 \sim n(n \geq 3)$ respectively are $z_{P1}, \ldots, z_{Pn}$. The maximum value of the reading is $\max(z_{P1}, \ldots, z_{Pn})$, the minimum value of the reading is $\min(z_{P1}, \ldots, z_{Pn})$, and the average value of the reading is $\mathrm{mean}(z_{P1}+z_{P2}+ \ldots +z_{Pn})$. Among the above maximum value, minimum value and average value, select one value as an adjusted reference value of the surface flatness of the bull gear plate 103.

S101.3, according to the adjusted reference value determined in step S101.2, then using the probe to detect the value of the reading of the surface of the bull gear plate 103 located directly above the fine-tuning unit 104, and the difference with the adjusted reference value is compared, using the fine-tuning unit 104 to adjust the surface flatness, and repeating the probe to measure the point position again until the surface flatness requirement <0.005 mm is met, that is, $\max(z_{P1}, \ldots, z_{Pn})-\min(z_{P1}, \ldots, z_{Pn})<0.005$. At this time, the Z axis rotation plane is approximately parallel to the XOY plane of the machine tool coordinate system.

Step S102, using the probe or the micrometer, combined with the first servo motor 102 of the base 1, to complete the adjustment of the overall depth of parallelism of the installation platform 2. The specific implementation plan is as follows.

Figure 4:
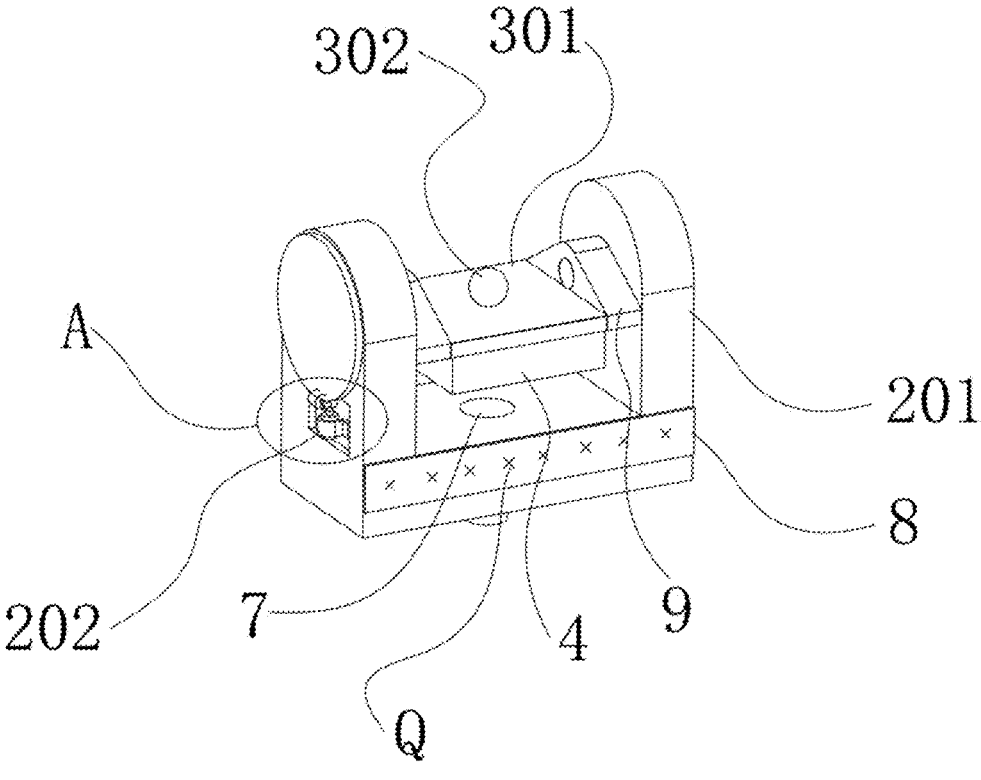
FIG. 4 is a three-dimensional structural schematic view of an installation platform according to the present application.
Figure 5:
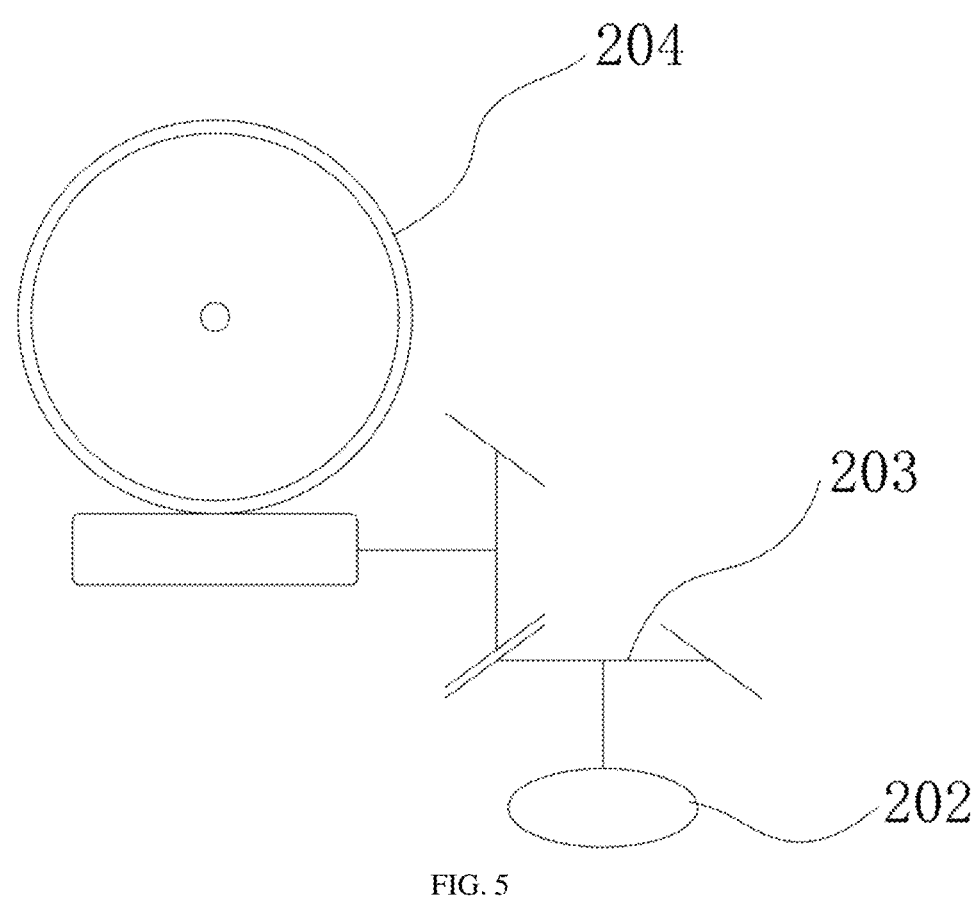
FIG. 5 is a structural enlarged abbreviated drawing of a structure of part A in FIG. 4.

S102.1, after completing the step S101, continuing to use the probe or micrometer to perform multiple point positions measurement on the alignment reference surface 8 (surface flatness <0.005 mm) of the installation platform 2, as shown in the measurement point position Q in FIG. 4 of the specification. The measurement method is that after the probe or micrometer contacts the first measurement point position, taking the first point position as the origin, keeping the Z axis coordinate unchanged, only moving the X axis to different coordinates, driving the probe to detect the above point position, and reading the actual coordinates of each point position $(x_{Qn}, y_{Qn})$.

S102.2, after obtaining the actual coordinates of each point position on the alignment reference surface 8 of the installation platform 2, adopting the least squares linear regression method to fit the actual coordinates to obtain the regression equation:

$$\hat{y} = k_1 \hat{x} + b_1.$$

Converting the slope $k_1$ into the inclination angle: $\theta_1 = \arctan(k_1)$, and calculating the pulse number of the first servo motor 102 in combination with the above inclination angle value and the gear ratio. The first servo motor 102 rotates around the Z axis according to the calculated pulse number. And then calling the probe or micrometer to repeat step S102.1 again, and comparing the Y coordinate values of all the point positions. If there is $\max(y_{Q1}, \ldots, y_{Qn})-\min(y_{Q1}, \ldots, y_{Qn}) < 0.005$ mm, the adjustment of the overall depth of parallelism of the installation platform 2 is completed. At this time, the alignment reference surface 8 of the installation platform 2 is approximately parallel to the XOZ plane of the machine tool coordinate system.

Step S103, using the probe or the micrometer, combined with the second servo motor 202 of the installation platform 2, and completing the leveling of the calibration assembly 3. The step-by-step implementation plan is as follows.

Figure 6:
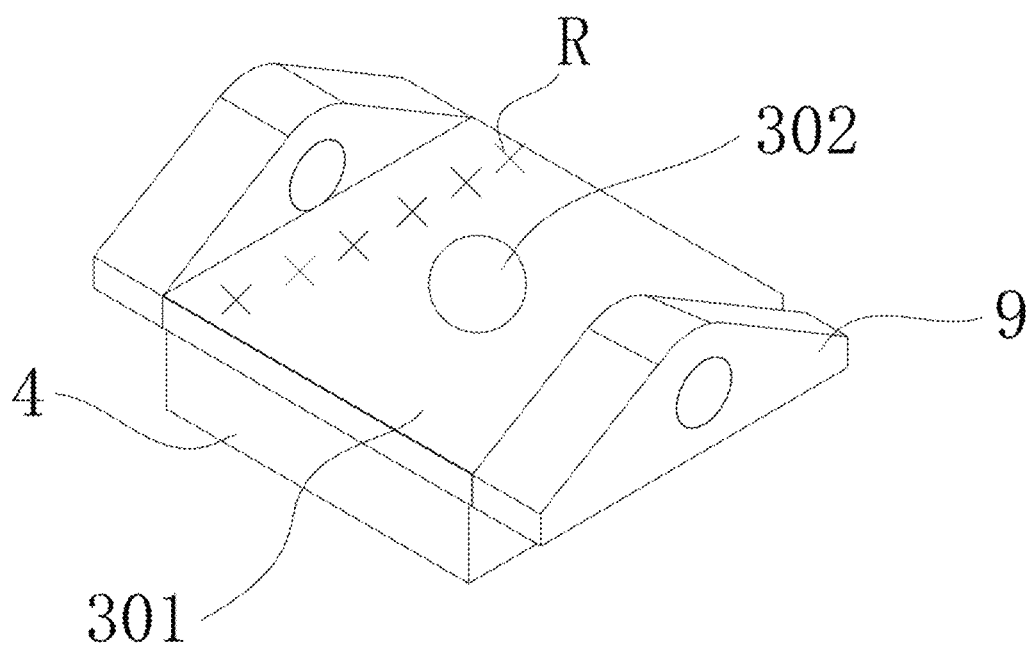
FIG. 6 is a three-dimensional structural schematic view of a calibration assembly according to the present application.
Figure 7:
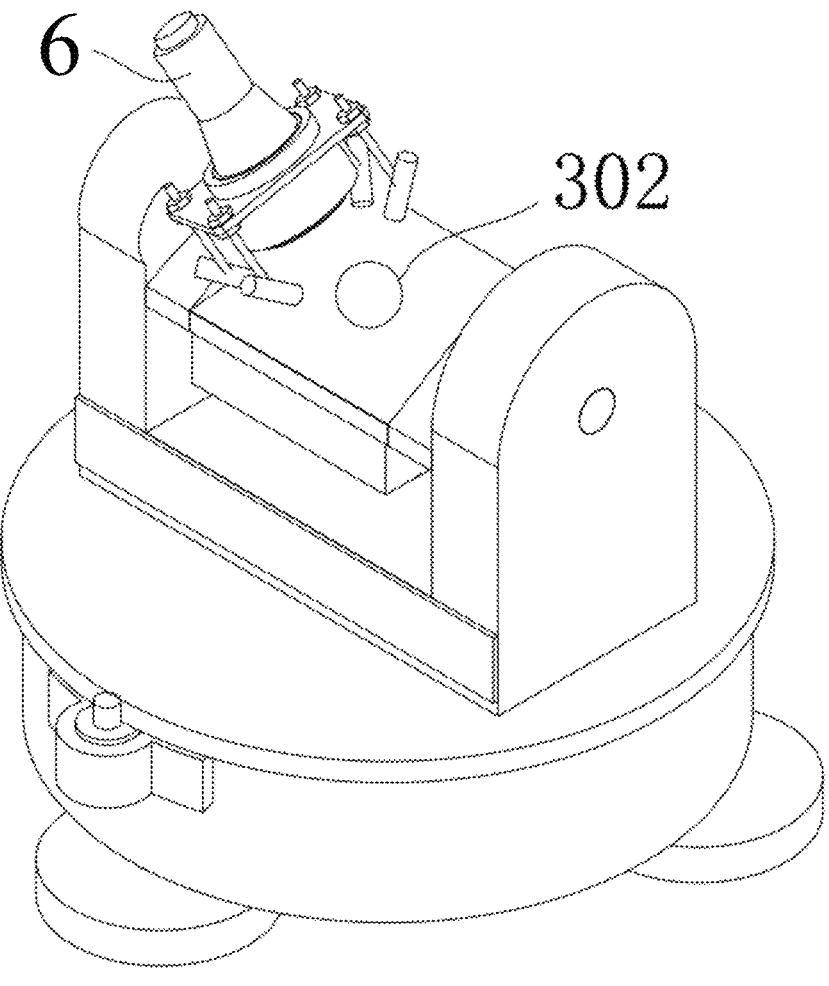
FIG. 7 is a schematic view of an application of a calibration device in combination with a camera system according to the present application.

S103.1, after completing the step S101 and step S102, continuing to use the probe or micrometer to perform multiple point position measurement on the matte plate 301 (surface flatness <0.005 mm) of the calibration assembly 3, as shown in the measurement point position R in FIG. 6 of the specification. The measurement method is that after the probe or micrometer contacts the first measurement point position, taking the first point position as the origin, keeping the X axis coordinate unchanged, and only moving the Y axis to different coordinates, and driving the probe to detect the above point position, and reading the actual coordinates of each point position $(y_{Rn}, z_{Rn})$.

S103.2, after obtaining the actual coordinates of each point position on the matte plate 301 of the calibration assembly 3, adopting the least squares linear regression method to fit the actual coordinates to obtain the regression equation:

$$\hat{z} = k_2 \hat{y} + b_2$$

Converting the slope $k_2$ into an inclination angle $\theta_2 = \arctan(k_2)$, and calculating the pulse number of the second servo motor 202 in combination with the above inclination angle value and the gear ratio. Using the second servo motor 202, the bevel gear pair 203 and the worm wheel and worm 204 to rotate around the X axis, and then calling the probe or micrometer to repeat step S103.1 again, and comparing the Z coordinate values of all the point positions. If there is $\max(z_{R1}, \ldots, z_{Rn})-\min(z_{R1}, \ldots, z_{Rn}) < 0.005$ mm, the calibration assembly 3 is aligned. At this time, the plane of the matte plate 301 is approximately parallel to the XY plane of the machine tool coordinate system.

Step S104, an application of the calibration device based on a Numerical Control (NC for short) program in the calibration process of photographic hole measurement.

As shown in FIG. 7 and FIG. 15 to FIG. 17 of the specification, after the camera system 6 is installed on the spindle end, the plane of the camera lens will rotate and change as the NC program is executed. In order to keep the calibration assembly 3 parallel to the camera lens at different rotation angles, which is convenient for illumination reinforcement and the position determination of the camera system laser point position, the calibration device needs to be synchronously rotated at different rotation angles based on the NC program, so as to achieve the parallelism of the calibration assembly 3 and the camera lens, and meet the camera's accurate measurement of the calibration ball.

The calibration assembly 3 is parallel to the camera lens, and the calibration device rotates synchronously with the NC program, and setting the current position of the first servo motor 102 of the base 1 and the current position of the second servo motor 202 of the installation platform 2 in the calibration device to zero; reading the rotation angle of the rotation axis in the NC program, according to the rotation angle of the NC program, it is divided into the following types.

First type: in response to that rotation angles of a machine tool's rotation axis are angle A and angle C, the corresponding angles are directly used to a rotation of the calibration device around a Z axis and a rotation of the calibration device around an X axis. The rotation increment is determined by the angle value and the transmission ratio.

Second type: in response to that the rotation angles of the machine tool's rotation axis are the angle A and angle B, first inversely solving the angle A and the angle B into vectors I, J, K Taking the BA double-swing head machine tool as an example, the inverse solution formula is: $I=\sin(B)$, $J=\cos(B)*\sin(-A)$, $K=\cos(B)*\cos(-A)$.

Then recalculating the I, J, K as the angle C and the angle A, $A=\arccos(K)$, and $C=\arctan(-I/J)$. After obtaining a new angle A and a new angle C, applying the new angle A and the new angle C to the rotation of the calibration device around the Z axis and the rotation of the calibration device around the X axis. The rotation increment is determined by the angle value and the transmission ratio.

Third type: in response to that the rotation angles of the machine tool's rotation axis are the angle B and the angle C, since the characteristics of the B angle are similar to those of the A angle in the CNC system, it can be directly determined that the angle B=the angle A, which is applied to the rotation of the calibration device around the Z axis and the rotation of the calibration device around the X axis. The rotation increment is determined by the angle value and the transmission ratio.

The rotation angle is determined by the configuration of the rotation axis of the five-axis machine tool, and can be one of three combinations, which are (A/C), (A/B), and (B/C).

Step S105, photographing the matte calibration ball 302 in the calibration assembly 3 in combination with the camera system 6, and using the image recognition technology to calculate the three-dimensional coordinates of the center position of the ball contour at different rotation angles.

Since the roundness of the matte calibration ball 302 on the matte plate 301 is less than 0.001 mm, the edge contour of the matte calibration ball 302 is still circular under any camera angle, that is, the edge contour of the calibration ball is not affected by the edge distortion caused by the camera system 6 error, and is very suitable for simulating the hole contour image formed by photographing of the hole on a plane. Therefore, the specific steps of completing the ball contour image recognition by combining the calibration device and the camera system 6 are as follows.

Figure 8:
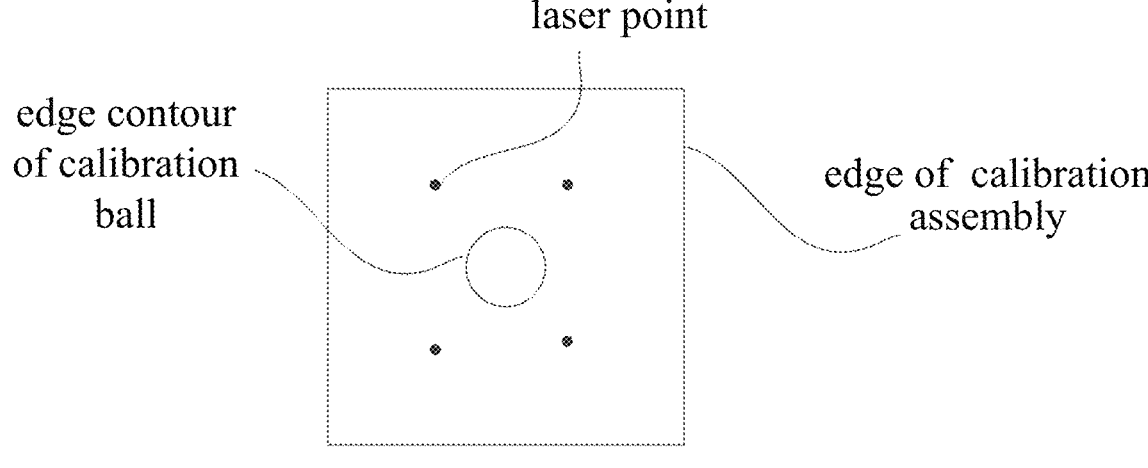
FIG. 8 is a result diagram that a calibration device photographs and measures a calibration ball in a camera system according to the present application.
Figure 15:
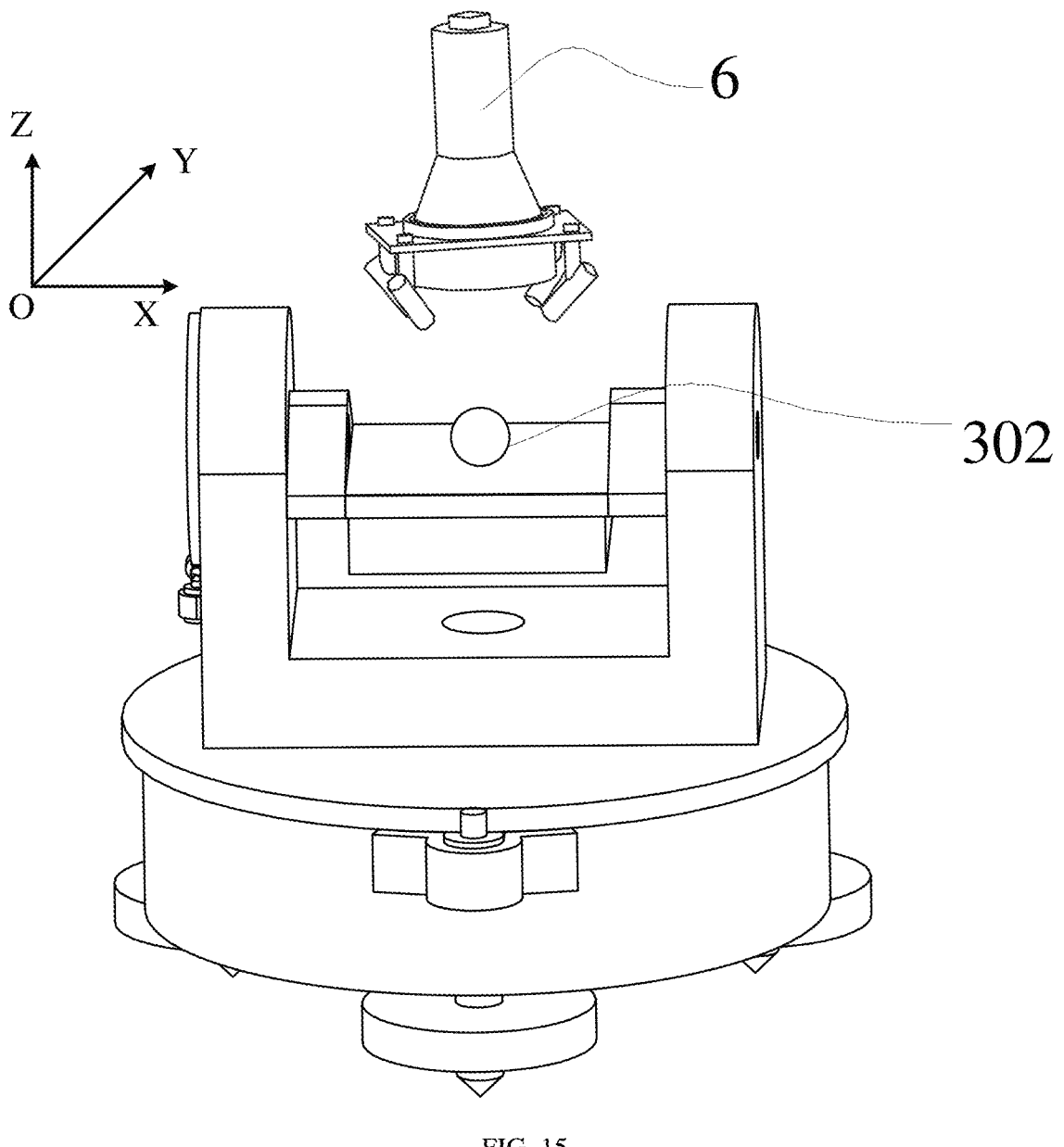
FIG. 15 is a schematic view of an application of a calibration device in combination with a camera system according to the present application.
Figure 16:
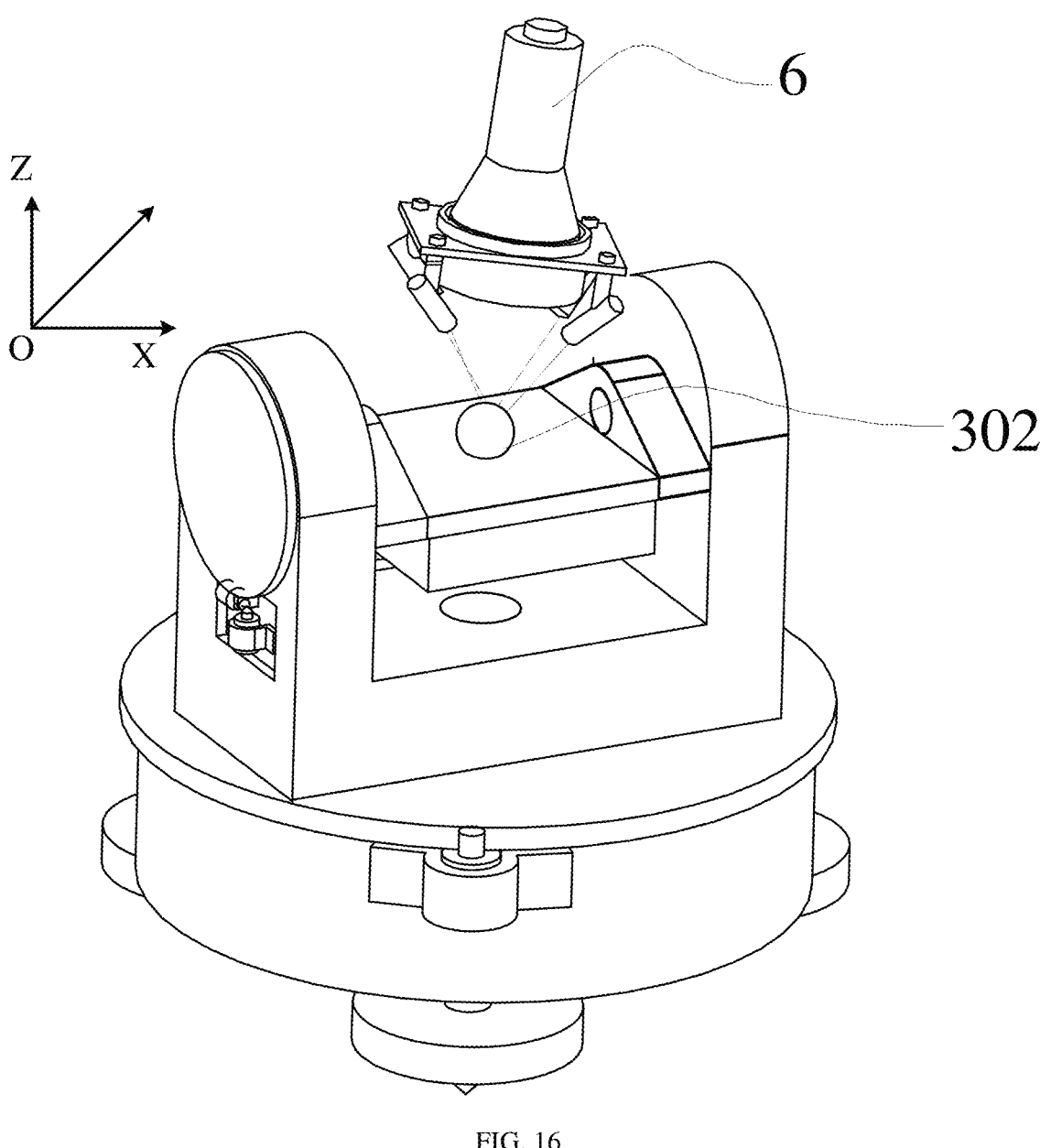
FIG. 16 is a schematic view of an application of a calibration device in combination with a camera system according to the present application.
Figure 17:
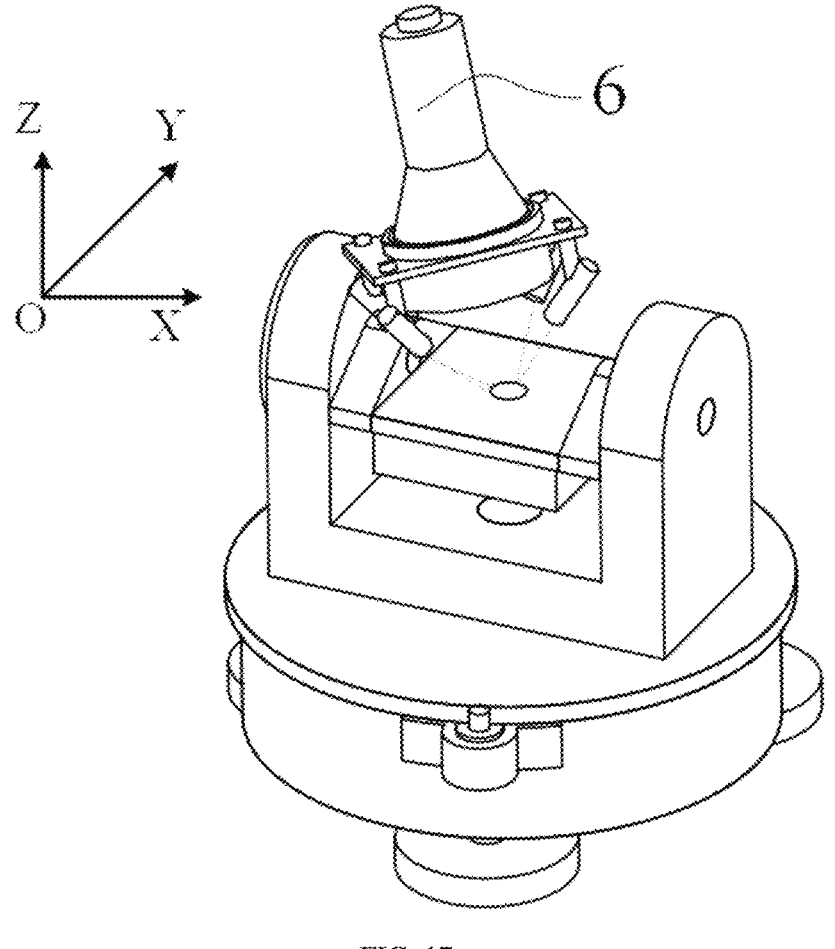
FIG. 17 is a schematic view of an application of a calibration device in combination with a camera system according to the present application.

S105.1, based on the camera system 6, the matte calibration ball 302 on the calibration assembly 3 is photographed. Since the photo is a plane image, as shown in FIG. 8 of the specification, the three-dimensional matte calibration ball 302 shows a circular contour in the photo, which is defined as a ball contour here. At the same time, four laser beams are irradiated on the matte plate 301, and distributed around the matte calibration ball 302. Therefore, the image obtained by photographing is the ball contour and four laser points;

S105.2, based on the image recognition technology, firstly identifying the contour envelope of the ball contour, obtaining the center position of the fitting circle by fitting the least square circle of the contour envelope, and then calculating the z value of the fitting circle (x, y) by the laser point position, thereby obtaining the actual center position of the ball contour (x, y, z).

The camera system 6 includes a telecentric lens and four laser pens, the four laser pens are evenly distributed in the circumferential direction of the lens, and the angle between the laser pen and the plane of the lens is 45°.

The image recognition technology includes but is not limited to Artificial Intelligence (AI) technologies such as the deep learning technology and the neural network technology.

Step S106, on a basis of a calibration ball contour position in an initial state, determining whether a degree of accuracy of all ball's center positions in step S105 meets a tolerance band requirement of 0.01 mm; in response to that the degree of accuracy of all the ball's center positions in step S105 do not meet the tolerance band requirement of 0.01 mm, a deviation between an actual value of a calibration ball contour center and a theoretical value of the calibration ball contour center is configured as a compensation value for correcting a movement displacement of the camera system 6 at different rotation angles, and repeating step S104 and step S105; in response to that the degree of accuracy of all the ball's center positions in step S105 meet the tolerance band requirement of 0.01 mm, exiting the iteration.

Due to the geometric error of the rotation axis of the CNC machine tool and the deflection error of the camera system 6, they will eventually be superimposed on the camera lens end, so that after the camera moves according to the NC program, the center position of the ball contour calculated by photographing the matte calibration ball 302 has a certain deviation. It is necessary to eliminate this deviation, that is, to perform a compensation iteration for a moving position of the camera system 6. The specific implementation steps are as follows:

S106.1, taking the center position of the ball contour during the first calibration as the data source, and taking the theoretical center position of the ball contour as the basis, it is traversed to determine whether the deviation between the center position of the ball contour at each rotation angle in step S105 and the theoretical value meets the tolerance band requirement of 0.01 mm.

S106.2, if the tolerance band requirement is not met, taking the deviation between the actual value and the theoretical value of the ball contour center as the compensation value, and the compensation value is superimposed on the coordinate value of the camera system theoretical NC instruction, and repeating step S105. If the tolerance band requirement is met, exiting the iteration, and saving the compensation value.

Step S107, outputting camera system movement compensation values of step S106 at different angles of the Numerical Control program, which is configured for a compensation of the Numerical Control program when the camera system 6 is measuring an actual skin's hole, and realizing a precise Computer Numerical Control countersinking of a skin part.

The calibration method proposed in this embodiment can effectively solve the problem that the contour of the calibration ball is not in the center of the photo when the camera system 6 photographs to measure the calibration ball due to the error of the machine tool's rotation axis. It not only improves the positioning accuracy of the camera system 6 at different rotation angles of the machine tool, but also ensures the positioning accuracy of the camera system 6 when photographing to measure the hole position in the skin, thereby realizing precise CNC countersinking of the skin.

In the description of the present application, it should be understood that, the orientation or positional relationship indicated by the terms "center", "longitudinal", "lateral", "front", "back", "left", "right", "vertical", "horizontal", "top", "bottom", "inside", "outside", etc. is based on the orientation or positional relationship shown in the accompanying drawings, which are merely for convenience of describing the present application and simplifying the description, and do not indicate or imply that the devices or elements referred to must have a specific orientation or must be constructed and operate in a specific orientation, therefore, it cannot be construed as a limitation on the present application.

In the description of the present application, it is further necessary to explain that, unless otherwise clearly stated and limited, the terms "provide", "install" and "connect" should be understood in a broad sense. For Embodiment, it can be a fixed connection, a detachable connection or an integral connection; it can be a mechanical connection or an electrical connection; it can be a direct connection or an indirect connection through an intermediate medium; it can be an internal connection between two components, or the interaction between two components. For those skilled in the art, the specific meanings of the above terms in the present application can be understood on a case-by-case basis.

The above is only some embodiments of the present application and does not constitute any form of limitation to the present application. Any simple modification or equivalent change made to the above embodiment based on the technical essence of the present application shall fall within the scope of the present application.

What is claimed is:

1. A calibration device for non-contact photographic hole measurement, comprising a base, an installation platform, a calibration assembly, and an illumination compensator;

the base comprising a base body, a first servo motor and a bull gear plate, wherein the first servo motor is provided at one side of the base body, the bull gear plate is provided at an upper surface of the base body, and the first servo motor is meshed with the bull gear plate and is configured to drive the bull gear plate to rotate around a Z axis;

the installation platform comprising a U-shaped base, a second servo motor, a bevel gear pair and a worm wheel and worm, wherein the U-shaped base is provided at an upper surface of the bull gear plate; the second servo motor, the bevel gear pair and the worm wheel and worm are all provided at the U-shaped base;

the second servo motor is connected to the bevel gear pair, and the bevel gear pair is connected to the worm wheel and worm;

the calibration assembly comprising a matte plate and a matte calibration ball, wherein the matte plate is provided at the U-shaped base and is connected to the worm wheel and worm, the matte calibration ball is provided at the matte plate, and the calibration assembly is configured to rotate around an X axis driven by the worm wheel and worm; the illumination compensator is composed of a high-brightness Light Emitting Diode (LED) lamp array and is provided at the matte plate to illuminate the matte calibration ball for a camera installed on a spindle end attached to the calibration device during a calibration process; and the matte calibration ball is provided on the matte plate.

2. The calibration device for non-contact photographic hole measurement according to claim 1, wherein the base further comprises a fine-tuning unit provided at a lower surface of the base body and configured to adjust a surface flatness of the base; the fine-tuning unit comprises an integrally formed anti-slip nut and a screw stem, and the anti-slip nut is fixedly sleeved on the screw stem; a threaded blind hole is provided at the base body, and one end of the screw stem provided with a thread is provided in the threaded blind hole and is threadedly connected to the base body.

3. The calibration device for non-contact photographic hole measurement according to claim 1, wherein the illumination compensator is provided at the matte plate and is provided below the matte calibration ball.

4. The calibration device for non-contact photographic hole measurement according to claim 1, wherein the illumination compensator comprises a Light Emitting Diode lamp array.

5. The calibration device for non-contact photographic hole measurement according to claim 1, wherein the bull gear plate is provided with an installing groove, and the U-shaped base is provided in the installing groove.

6. The calibration device for non-contact photographic hole measurement according to claim 1, wherein the bull gear plate is provided with a first tapered hole, the U-shaped base is provided with a second tapered hole coaxial with the first tapered hole, and a taper pin is provided in the first tapered hole and the second tapered hole.

7. The calibration device for non-contact photographic hole measurement according to claim 1, wherein an alignment reference surface is provided at the U-shaped base.

8. The calibration device for non-contact photographic hole measurement according to claim 1, wherein auxiliary installation blocks are respectively provided at inner walls of both sides of the U-shaped base, and both ends of the matte plate are respectively fixedly connected to the auxiliary installation blocks; one of the auxiliary installation blocks is rotatably connected to the inner wall of one side of the U-shaped base by a pin shaft, and a rotation shaft is rotatably provided at the inner wall of the other side of the U-shaped base; one end of the rotation shaft is connected to the worm wheel and worm, and the other end of the rotation shaft is connected to the other auxiliary installation block.

9. The calibration device for non-contact photographic hole measurement according to claim 1, wherein the matte plate is made of a translucent acrylic plate.

10. The calibration device for non-contact photographic hole measurement according to claim 1, wherein the matte calibration ball is made of a matte ceramic ball with a diameter of 10 mm and a ball's roundness of less than 0.001 mm.

11. A calibration method for non-contact photographic hole measurement, wherein the calibration method is implemented by adopting a calibration device for non-contact photographic hole measurement; the calibration method comprises:

step S101, leveling an overall reference of the calibration device;

using a fine-tuning unit of a base to adjust a surface flatness based on a probe or a micrometer, and making a surface flatness of the calibration device less than 0.005 mm;

step S102, adjusting a depth of parallelism of an installation platform;

using a first servo motor of the base to adjust a depth of parallelism based on the probe or the micrometer, and making the depth of parallelism of the installation platform less than 0.005 mm;

step S103, leveling a calibration assembly;

using a second servo motor of the installation platform to adjust the surface flatness based on the probe or the micrometer, and making a surface flatness of the calibration assembly less than 0.005 mm;

step S104, applying the calibration device based on a Numerical Control program;

in response to that a camera lens moves at different rotation angles according to the Numerical Control program, the calibration device rotates synchronously cooperatively according to calculation rules, and makes a matte plate in the calibration assembly be parallel to the camera lens;

step S105, photographing a matte calibration ball and calculating three-dimensional coordinates of a center position of a ball contour by a camera system;

photographing the matte calibration ball in the calibration assembly in combination with a camera system, and adopting an image recognition technology to complete a calculation of the three-dimensional coordinates of the center position of the ball contour at different rotation angles;

step S106, performing a compensation iteration for a moving position of the camera system;

on a basis of a calibration ball contour position in an initial state, determining whether a degree of accuracy of all ball's center positions in step S105 meets a tolerance band requirement of 0.01 mm; in response to that the degree of accuracy of all the ball's center positions in step S105 do not meet the tolerance band requirement of 0.01 mm, a deviation between an actual value of a calibration ball contour center and a theoretical value of the calibration ball contour center is configured as a compensation value for correcting a movement displacement of the camera system at different rotation angles, and repeating step S104 and step S105; in response to that the degree of accuracy of all the ball's center positions in step S105 meet the tolerance band requirement of 0.01 mm, exiting the iteration;

step S107, outputting camera system movement compensation values of step S106 at different angles of the Numerical Control program, which is configured for a compensation of the Numerical Control program when the camera system is measuring a metal skin maintenance hole, and realizing a precise Computer Numerical Control countersinking of a metal skin; wherein in the step S104, the calculation rules of the calibration device comprise:

in response to that rotation angles of a machine tool's rotation axis are angle A and angle C, directly applying the angle A and the angle C to a rotation of the calibration device around a Z axis and a rotation of the calibration device around an X axis;

in response to that the rotation angles of the machine tool's rotation axis are the angle A and angle B, first inversely solving the angle A and the angle B into vectors I, J, K, then recalculating the I, J, K as the angle C and the angle A, $A=\arccos(K)$ and $C=\arctan(-I/J)$; after obtaining a new angle A and a new angle C, applying the new angle A and the new angle C to the rotation of the calibration device around the Z axis and the rotation of the calibration device around the X axis; and in response to that the rotation angles of the machine tool's rotation axis are the angle B and the angle C, directly determining that the angle B=the angle A, which is applied to the rotation of the calibration device around the Z axis and the rotation of the calibration device around the X axis;

the calibration device for non-contact photographic hole measurement comprises the base, the installation platform, and the calibration assembly, the base comprising a base body, the first servo motor and a bull gear plate, wherein the first servo motor is provided at one side of the base body, the bull gear plate is provided at an upper surface of the base body, and the first servo motor is meshed with the bull gear plate and is configured to drive the bull gear plate to rotate around the Z axis;

the installation platform comprising an U-shaped base, the second servo motor, a bevel gear pair and a worm wheel and worm, wherein the U-shaped base is provided at an upper surface of the bull gear plate; the second servo motor, the bevel gear pair and the worm wheel and worm are all provided at the U-shaped base; the second servo motor is connected to the bevel gear pair, and the bevel gear pair is connected to the worm wheel and worm; and the calibration assembly comprising the matte plate and the matte calibration ball, wherein the matte plate is provided at the U-shaped base and is connected to the worm wheel and worm, the matte calibration ball is provided at the matte plate; the ball's center position of the matte calibration ball is provided at an intersection position of a rotation center of the base and a rotation center of the installation platform; the calibration assembly is configured to rotate around the X axis driven by the worm wheel and worm.

12. The calibration method for non-contact photographic hole measurement according to claim 11, wherein the step S101 comprises:

using the probe or the micrometer to perform multiple point positions measurement on an upper surface of the bull gear plate, and selecting one of a maximum value of measured data, a minimum value of the measured data and an average value of the measured data as an adjusted reference value; taking a difference between the measured data and the reference value as an adjustment basis, and adjusting the surface flatness of the calibration device as a whole by the fine-tuning unit.

13. The calibration method for non-contact photographic hole measurement according to claim 11, wherein the step S102 comprises:

using the probe or the micrometer to perform multiple point positions detection on an alignment reference surface of the installation platform according to a rule that the Z axis coordinate remains unchanged, selecting (x, y) coordinates in detection data for linear fitting, and obtaining a slope of a fitting line $k_1$ and an inclination angle of the fitting line $\theta_1=\arctan(k_1)$; adjusting the alignment reference surface of the installation platform to be parallel to a XOZ plane of a machine tool coordinate system in combination with the first servo motor, and setting a current rotation angle of the first servo motor to zero after completing adjustment.

14. The calibration method for non-contact photographic hole measurement according to claim 11, wherein the step S103 comprises:

using the probe or the micrometer to perform multiple point positions measurement on the matte plate according to a rule that the X axis coordinate remains unchanged, selecting (y, z) coordinates in detection data for linear fitting, and obtaining a slope of a fitting line $k_2$ and an inclination angle of the fitting line $\theta_2=\arctan(k_2)$, combining the second servo motor, the bevel gear pair and the worm wheel and worm to complete an overall rotation of the calibration assembly, and finally adjusting a plane of the matte plate to be parallel to a XOY plane of a machine tool coordinate system, and setting a current rotation angle of the second servo motor to zero after completing adjustment.

* * * * *